United States Patent [19]

Ishii

[11] 4,380,045
[45] Apr. 12, 1983

[54] THYRISTOR CONVERTOR FAILURE DETECTION DEVICE

[75] Inventor: Toshiaki Ishii, Ichinomiya, Japan

[73] Assignee: Mitsubishi Denki Kabushiki Kaisha, Tokyo, Japan

[21] Appl. No.: 290,698

[22] Filed: Aug. 6, 1981

[30] Foreign Application Priority Data

Dec. 8, 1980 [JP] Japan ................. 55-172815

[51] Int. Cl.³ ........................................... H02H 7/125
[52] U.S. Cl. ....................................... 363/54; 363/46
[58] Field of Search ..................... 363/44-48,
363/52-54, 87, 128-129; 361/79, 87, 93;
318/345 C, 345 G, 434, 506

[56] References Cited

U.S. PATENT DOCUMENTS 3,617,836 11/1971 Henry ........................ 318/434 X
3,849,719 11/1974 Geiersbach et al. ............ 363/47 X
4,133,018 1/1979 Terunuma et al. ............. 363/54 X

FOREIGN PATENT DOCUMENTS 2203070 2/1979 Fed. Rep. of Germany ........ 363/54
630700 10/1978 U.S.S.R. .............................. 363/54

Primary Examiner—William M. Shoop
Assistant Examiner—Peter S. Wong
Attorney, Agent, or Firm—Wenderoth, Lind & Ponack

[57] ABSTRACT

A failure detection device for a convertor which converts alternating current into a direct current through a plurality of rectifying thyristors. The waveform of the output direct current of the convertor is detected and is supplied to a band-pass filter which selectively passes the harmonic component which has a frequency corresponding to that of the AC voltage source for the convertor. The existence of the component of this frequency is characteristic of an occurrence of a failure within convertor. The amplitude of the component passing through the filter is then detected by a zener diode, and a failure signal is generated when the amplitude exceeds a predetermined level.

4 Claims, 5 Drawing Figures

THYRISTOR CONVERTOR FAILURE DETECTION DEVICE

BACKGROUND OF THE INVENTION

This invention relates to failure detection devices for convertors.

Thyristor convertors which convert alternating current into direct current comprise a plurality of series connected thyristors and fuses connected between an alternating current voltage source and a direct current load. For the purpose of detecting the occurrence of failures in these thyristor convertors, blown fuse detectors which detect the blowing out of the fuses are usually provided. Thus, when one of the thyristors is subjected to abnormal conduction failure, i.e. becomes abnormally conductive in the reverse direction, a short circuit occurs through such thyristor, and the fuse that is series connected therewith is blown out, which in turn is detected by the blown fuse detector. But in the case of abnormal nonconduction failure, i.e. when one of the thyristors becomes abnormally nonconductive in the forward direction, because of, for example, a failure in the firing circuit of the thyristor, the failure does not usually lead to the blowing out of the series connected fuse, and thus may not be detected by the blown fuse detectors.

It has been proposed to detect such abnormal nonconduction failure of the thyristors by sensing the periods in which the thyristors are conductive. Such conductive period sensor, however, must be provided for each thyristor, and must be electrically insulated from the main convertor circuit, which results in complicated and expensive failure detection circuits.

SUMMARY OF THE INVENTION

Thus, an object of the present invention is to provide a failure detection device for convertor circuits which is capable of detecting failures of rectifier elements in the convertor circuit, including abnormal nonconduction failure.

A further object of the present invention is to provide a failure detection device capable of such detection, and yet, which has a simple circuit arrangement.

The convertor with which the failure detection device of the present invention is used converts alternating current into direct current by a plurality of rectifier elements connected between an alternating current voltage source and a direct current load. The failure detection device according to the present invention comprises a waveform detector which detects the waveform of the output direct current of the convertor. A harmonic component detector detects the harmonic component contained in the waveform which has a frequency that is characteristic of the convertor failure. The frequency is characteristic of the occurrence of a failure within the convertor, and is negligible when the convertor is functioning normally. The frequency corresponds to that of the alternating current voltage source. The existance of the harmonic component in the waveform exceeding a certain level is indicative of an occurrence of failure within the convertor. Thus, the failure detection device according to the present invention further comprises an amplitude detector which detects the amplitude of the detected harmonic component, and produces a failure signal when the amplitude of the harmonic component exceeds a predetermined level.

The waveform detector can comprise a current transformer which is coupled to the alternating current voltage source and measures the current flowing therethrough, because the sum total of the current flowing through the voltage source corresponds to the output direct current of the convertor.

Further, the harmonic component detector may include a band-pass filter for selectively passing the harmonic component having the frequency that is characteristic of an occurrence of a failure within the convertor.

BRIEF DESCRIPTION OF THE DRAWINGS

Other objects, features and advantages of the present invention will become more apparent from the following detailed description of the preferred embodiments, the appended claims, and the accompanying drawings, in which:

In the drawings, like reference numerals and characters represent like or corresponding components.

DETAILED DESCRIPTION OF THE PREFERRED EMBODIMENTS

Figure 1:
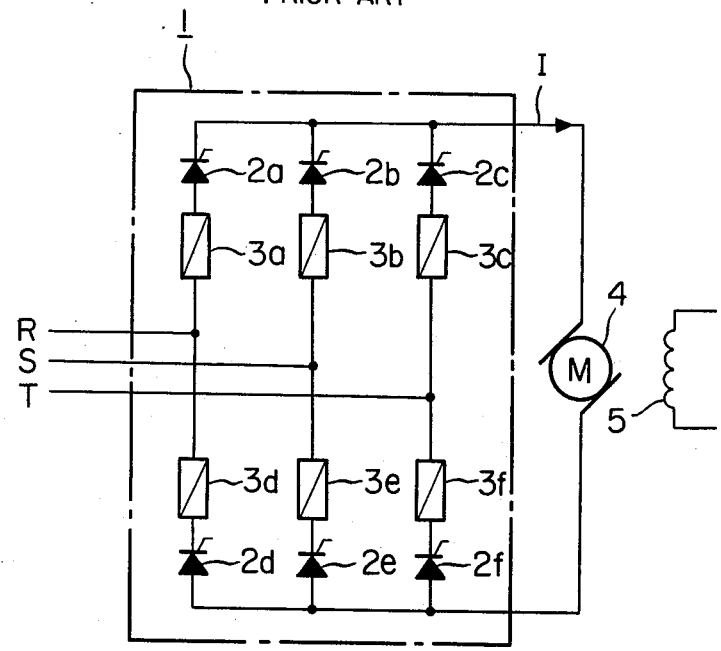
FIG. 1 is a circuit diagram of a thyristor convertor which supplies direct current to a DC motor from an AC voltage source.

As an example of thyristor convertors with which the failure detection device of the present invention is used, a static Ward-Leonard speed control system for a direct current motor is illustrated in FIG. 1. Power supply lines R, S and T from a three phase AC current source (not shown) are connected to a thyristor convertor 1 which comprises thyristors 2a through 2f and fuses 3a through 3f, which are respectively series connected in a three phase full-wave rectifier bridge circuit. The output I of the convertor 1 is coupled to the armature winding 4 of a direct current motor M which further includes a field winding 5. The electric motor M drives, for example, an elevator car, and in such applications another set of thyristors having reverse polarities to those of the thyristors shown in FIG. 1 are also provided to supply direct current to reverse polarity. However, the description thereof is omitted from the present description since the structure and operation thereof is the same to that of the thyristors shown in FIG. 1.

As the thyristor convertor of FIG. 1 is well known, the description of the normal operation thereof is deemed unnecessary. The operation thereof during the occurrence of a failure will now be described along with the operation of conventional failure detectors.

In the case of abnormal conduction failure, i.e. one of the thyristors 2a through 2f becomes abnormally conductive in the reverse direction, an interphase short circuit occurs among the lines of the AC voltage sources due to the failing thyristor, and this results in the blowing out of the fuses series connected with the failing thyristors. Thus, when, for example, the thyristor 2a is subjected to abnormal conduction failure, an interphase short circuit occurs between the lines R and S of the voltage source through the circuit of the fuse 3b, the thyristor 2b, the thyristor 2a, and the fuse 3a, and the fuse 3a or the fuse 3b is blown out. Conventionally, the blowing out of the fuse 3a or 3b is detected by blown fuse detectors and the load, the electric motor M, for example, is stopped upon detection of the blowing out of one of the fuses.

Figure 2:
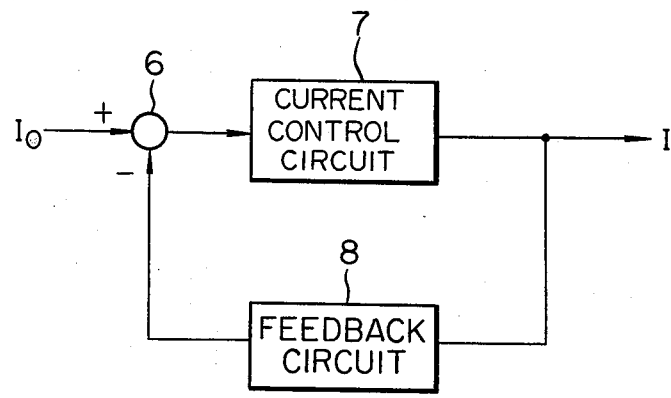
FIG. 2 is a block diagram of a feedback control circuit for the convertor of FIG. 1.

In the case of abnormal nonconduction failure, i.e. when one of the thyristors 2a through 2f becomes abnormally nonconductive in the forward direction thereof, none of the fuses 3a through 3f are blown out, and thus the failure may not be detected by the conventional blown fuse detectors. Abnormal nonconduction failures of the thyristors may be caused by failures in the firing circuits thereof, as well as by the failures in the thyristors themselves. The convertor 1 of FIG. 1 is usually controlled by a negative feedback system schematically shown in FIG. 2. The amplitude of the output direct current I of the current control circuit 7 including the convertor 1 of FIG. 1 is detected by the feedback circuit 8 and negatively fed back to the adder 6 which adds the fed back value to the command value $I_o$ Thus, even when one of the thyristors 2a through 2f undergoes abnormal nonconduction failure, the rest of the thyristors compensate for the deficiency, and the averages output current I remains at substantially the normal level. However, when this occurs, for example, the thyristor 2a is subjected to abnormal nonconduction failure, the rest of the thyristors 2b through 2f are overloaded, which may well result in failures of any one or all of these thyristors 2b through 2f.

To sense this type of failure it has been proposed to sense the conduction periods of the thyristors 2a through 2f, because the thyristors 2a through 2f are normally conductive for 120 electrical degrees, and the fact that some of them are conductive for a longer period of time, means that one or more of the other thyristors are undergoing abnormal nonconduction failure. Such period sensors which detect the conductive periods of the thyristors, however, must be provided for each thyristor in the convertor 1, and electrical insulation must also be provided between the sensor circuits and the main convertor circuit, which results in a complicated and expensive sensor circuit arrangement.

Figure 3:
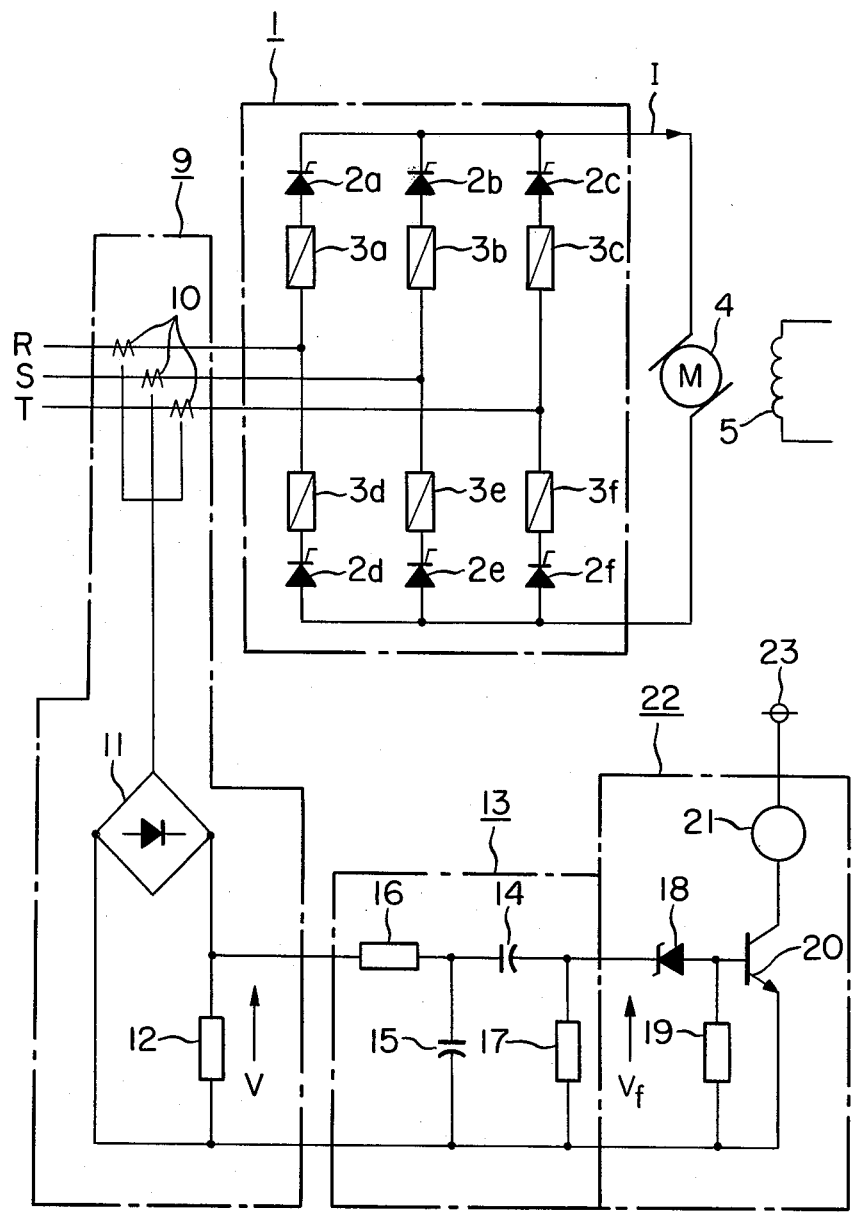
FIG. 3 is a circuit diagram of a failure detection device according to the present invention and the thyristor convertor with which the detection device is used.
Figure 4:
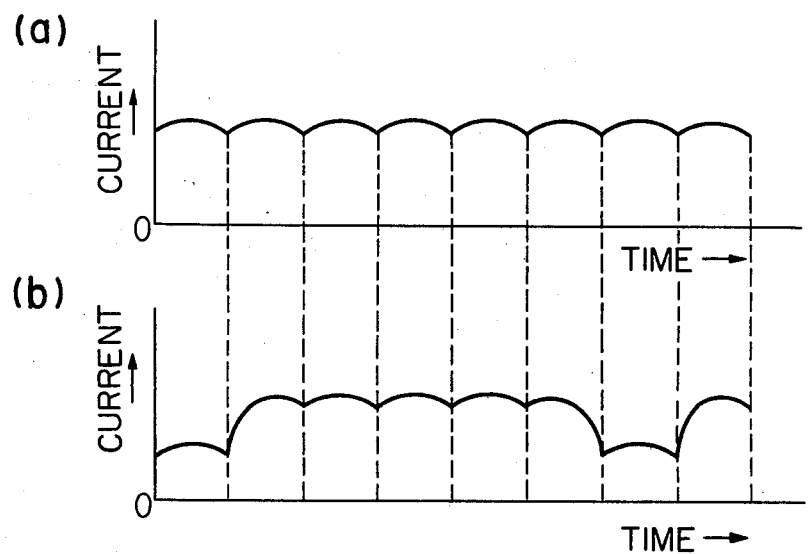
FIGS. 4a and 4b are diagrams showing the waveforms of the output direct current of the convertor of FIG. 3 which are detected by the waveform detector of the detection device of FIG. 3 when the convertor is in normal and failure modes respectively.
Figure 5:
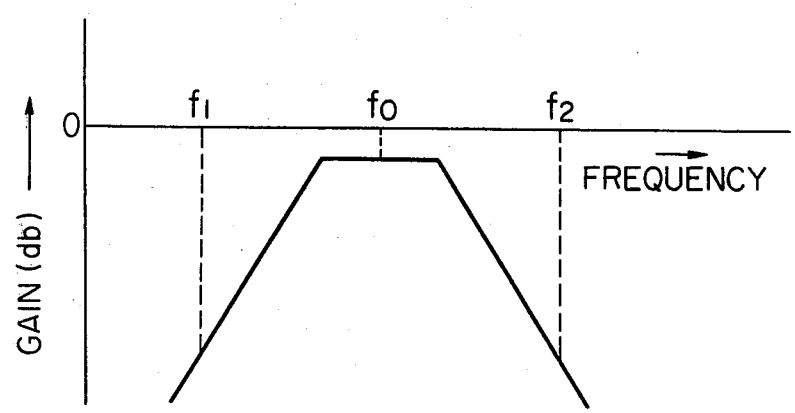
FIG. 5 is a diagram showing the frequency to gain characteristics of the band-pass filter provided in the failure detection device of FIG. 3, which is used to detect the harmonic component which is characteristic of an occurrence of a failure within the convertor.

Referring now to FIGS. 3 to 5, the failure detection device of the present invention which has a simple construction, but which is capable of detecting abnormal nonconduction failure of the thyristors will be described.

The convertor 1 which converts AC current supplied from the AC voltage source through lines R, S and T into DC output current I, and supplies the DC current I to the DC electric motor M is the same as that of FIG. 1.

The failure detection device first has a waveform detector 9, which includes a current transformer 10 coupled to the AC voltage source lines R, S, and T, a rectifier circuit 11 having input terminals connected to the transformer 10, and a resistor 12 connected across output terminals of the rectifier circuit 11. A voltage V is developed across the resistor 12 which has a waveform corresponding to that of the overall current flowing through the lines R, S, and T, which waveform in turn corresponds to the waveform of the output direct current I flowing through the DC electric motor M. A band-pass filter 13 is provided which comprises a series connection of a capacitor 15 and a resistor 16 connected across the resistor 12, and another series connection of a capacitor 14 and a resistor 17 connected across the capacitor 15. The band-pass filter 13 of this embodiment constitutes the harmonic component detector means of the failure detection device according to the present invention, and develops across the resistor 17 voltage $V_f$ corresponding to the level of a harmonic component of the waveform, which component is characteristic of an occurrence of a failure within the convertor 1. The failure detection device finally includes an amplitude detector 22 comprising a series connection of a zener diode 18 and a resistor 19 connected across the resistor 17 of the band-pass filter, and a series connection of a failure signalling relay 21 and a transistor 20, the base terminal of which is connected to the anode of the zener diode 18. The other terminal of the relay 21 is connected to a positive voltage terminal 23.

Now, the operation of the failure detection device of FIG. 3 will be explained in detail with reference to FIGS. 4 and 5.

The waveform of the output direct current I detected by the waveform detector 9 normally has a form as shown in FIG. 4a which includes ripples having a fundamental frequency $f_2$ six times that of the AC voltage source, and a frequency $f_1$ which is the fundamental frequency of the motor current when the elevator is running normally.

Thus, when the convertor 1 is in the normal operating condition, the voltage V having a waveform as shown in FIG. 4a is developed across the resistor 12. The feedback circuit 8 of FIG. 2, by the way, may use this circuit arrangement for sensing the level of the output current I and feed the level of the voltage V to the adder 6.

The waveform of the output current I changes into a form such as that shown in FIG. 4b when one of the thyristors 2a through 2f undergoes a nonconduction failure.

A waveform having a frequency $f_0$ is developed in the current I when one of the thyristors 2a through 2f undergoes a failure. The frequency $f_0$ is the frequency of the AC supply, and $f_0$ is the harmonic component which is characteristic of an occurrence of a failure within the convertor 1. Normally the voltage V developed across the resistor 12 thus has a waveform which includes a harmonic component having the frequency $f_2$ equal to that of the ripples in output current I and the frequency $f_1$.

The frequency vs. gain characteristic of the band-pass filter is schematically represented in FIG. 5. The harmonic components of the waveform of the voltage V which have frequencies $f_1$ and $f_2$ are substantially attenuated. The harmonic component of the waveform of the voltage V which has frequency $f_0$, equal to the frequency of the AC voltage source, however, is not attenuated by the filter 13. The voltage $V_f$ developed across the resistor 17 corresponds to the level of the harmonic component of frequency $f_0$ contained in the waveform of the current I.

As has been explained above, the voltage V developed across the resistor 12 under normal conditions has a waveform which has a fundamental frequency $f_1$ and ripple $f_2$. Thus, the amplitude of voltage $V_f$ developed across the resistor 17 during normal operation in which there is substantially no harmonic component of frequency $f_0$ is sufficiently lower than the zener voltage, i.e. the breakdown voltage, of the zener diode 18, so that the transistor remains nonconductive. Thus, the failure signalling relay 21 is not activated.

When one of the thyristors fails, however, the voltage V developed across the resistor 12 has a waveform which contains a harmonic component of frequency $f_0$, and thus the voltage $V_f$ developed across the resistor 17 increases and exceeds the zener voltage of the diode 18. Thus, the transistor 20 becomes conductive and the failure signalling relay 21 is activated and produces a failure signal. When the relay 21 is activated, the armature 4 of the electric motor M may be deenergized by the failure signal, or an alarm bell (not shown) may be energized.

If voltage $V_f$ is too small to be detected, an amplifier (not shown) which amplifies the output voltage $V_f$ of the harmonic component detector 13 and supplies the amplified value to the amplitude detector 22 may be added.

Furthermore, for the purpose of reducing the occurrences of erroneous failure signals, it is possible to provide a device in the amplitude detector which activates the relay 21 only when the transistor is conductive for a predetermined period of time.

Although an embodiment of the present invention in which a band-pass filter for selectively passing the harmonic component having the frequency which is characteristic of an occurrence of a failure within the convertor is used as the harmonic component detector has been described, it is apparent that a band-rejection filter which selectively attenuates the harmonic component of said frequency can also be used as such a detector.

While the present invention has been disclosed in connection with the preferred embodiment thereof, it should be understood that there may be other embodiments which fall within the spirit and scope of the invention as defined by the following claims.

What is claimed is:

1. A failure detection device for a convertor circuit which converts alternating current into an output direct current through a plurality of rectifying elements connected between an alternating current voltage source and a direct current load, said failure detection device comprising:
    waveform detector means for detecting the waveform of said output direct current of said convertor, and for producing a waveform signal corresponding to said waveform;
    harmonic component detector means connected to said waveform detector means and responsive to said waveform signal for detecting a harmonic component of said waveform, and for producing a harmonic component signal corresponding to said harmonic component, said harmonic component being a harmonic component having a frequency which is characteristic of an occurrence of a failure within said convertor; and
    amplitude detector means connected to said detector means and responsive to said harmonic component signal for detecting the amplitude of said harmonic component and for producing a failure signal when said amplitude of said harmonic component exceeds a predetermined level.

2. A failure detection device as claimed in claim 1, wherein said harmonic component detector means comprises a band-pass filter for selectively passing the harmonic component having said frequency.

3. A failure detection device as claimed in claim 1 or 2, wherein said frequency of said harmonic component corresponds to the frequency of said alternating current voltage source.

4. A failure detection device as claimed in claim 1 or 2, wherein said waveform detector means comprises a current transformer coupled to said alternating current voltage source for detecting said alternating current flowing from said voltage source to said convertor circuit.

* * * * *